US008702313B2

(12) United States Patent
Liang et al.

(10) Patent No.: US 8,702,313 B2
(45) Date of Patent: Apr. 22, 2014

(54) ROLLER BEARING ASSEMBLY HAVING A RADIAL SHAFT SEAL RING

(75) Inventors: Baozhu Liang, Hambach (DE); Thomas Peuschel, Schonungen (DE); Michael Reugels, Haβfurt (DE); Alfred Schwappach, Bundorf (DE)

(73) Assignee: Aktiebolaget SKF, Gothenburg (SE)

( * ) Notice: Subject to any disclaimer, the term of this patent is extended or adjusted under 35 U.S.C. 154(b) by 8 days.

(21) Appl. No.: 13/387,142

(22) PCT Filed: Jul. 29, 2010

(86) PCT No.: PCT/EP2010/060999
§ 371 (c)(1),
(2), (4) Date: Mar. 27, 2012

(87) PCT Pub. No.: WO2011/012667
PCT Pub. Date: Feb. 3, 2011

(65) Prior Publication Data
US 2012/0177316 A1    Jul. 12, 2012

(30) Foreign Application Priority Data
Jul. 31, 2009   (EP) ..................................... 09009920

(51) Int. Cl.
*F16C 33/78*   (2006.01)
(52) U.S. Cl.
USPC ........................... 384/484; 384/482; 277/345
(58) Field of Classification Search
USPC ......... 384/470, 477–478, 482–488, 548, 585, 384/607, 618; 277/345, 353, 549, 565, 508, 277/586, 349
See application file for complete search history.

(56) References Cited

U.S. PATENT DOCUMENTS

| | | | | |
|---|---|---|---|---|
| 2,873,153 A | * | 2/1959 | Haynie | 384/484 |
| 3,014,768 A | * | 12/1961 | Dickinson | 384/484 |
| 3,245,735 A | * | 4/1966 | Sikora | 384/482 |
| 3,628,837 A | * | 12/1971 | Otto | 384/462 |
| 3,856,368 A | * | 12/1974 | Andersen | 384/485 |
| 4,309,063 A | * | 1/1982 | Weis | 384/482 |
| 4,325,591 A | * | 4/1982 | Otto | 384/486 |
| 4,650,195 A | * | 3/1987 | Dreschmann et al. | 384/486 |
| 4,692,040 A | * | 9/1987 | Ebaugh et al. | 384/484 |
| 4,872,770 A | * | 10/1989 | Dickinson | 384/484 |
| 5,441,452 A | | 8/1995 | Jackel et al. | |

(Continued)

FOREIGN PATENT DOCUMENTS

| | | | | |
|---|---|---|---|---|
| DE | 2753340 A1 | * | 5/1979 | F16C 33/78 |
| DE | 112006002478 T5 | | 7/2008 | |
| FR | 2585420 A1 | * | 1/1987 | F16C 33/46 |
| IT | 11506248 A | | 12/1954 | |

*Primary Examiner* — Marcus Charles
(74) *Attorney, Agent, or Firm* — Bryan Peckjian; SKF USA Inc. Patent Dept.

(57) ABSTRACT

A roller bearing assembly includes at least one roller bearing having an outer ring, an inner ring, and roller bodies disposed therebetween, as well as a radial shaft seal ring having a support ring and a seal lip. At least one end side of the outer ring includes a receptacle for retaining the support ring. The support ring extends axially in an outwardly projecting manner beyond the end side of the outer ring and up to an outer circumferential surface of the inner ring. The seal lip connected with the support ring sealingly abuts on the outer circumferential surface of the inner ring at a position that is axially internal of the end side of the outer ring.

19 Claims, 4 Drawing Sheets

(56) References Cited

U.S. PATENT DOCUMENTS

| | | | |
|---|---|---|---|
| 5,535,516 A * | 7/1996 | Goodell et al. | 29/894.361 |
| 5,711,616 A * | 1/1998 | Gassmann et al. | 384/482 |
| 5,860,748 A * | 1/1999 | Okumura et al. | 277/562 |
| RE36,804 E * | 8/2000 | Kajihara et al. | 384/480 |
| 6,217,223 B1 * | 4/2001 | Brockmuller et al. | 384/523 |
| 6,227,713 B1 * | 5/2001 | Neder et al. | 384/484 |
| 6,241,396 B1 * | 6/2001 | Shimomura et al. | 384/477 |
| 6,607,196 B2 * | 8/2003 | Carlsson | 277/353 |
| 2009/0116776 A1 | 5/2009 | Ito | |

* cited by examiner

ROLLER BEARING ASSEMBLY HAVING A RADIAL SHAFT SEAL RING

CROSS-REFERENCE

This application is the U.S. national stage of International Application No. PCT/EP2010/060999 filed on Jul. 29, 2010, which claims priority to European patent application no. 09 009 920.1 filed on Jul. 31, 2009.

TECHNICAL FIELD

The invention relates to a roller bearing assembly including at least one roller bearing having an outer ring and an inner ring and roller bodies disposed therebetween, as well as a radial shaft seal having a support ring and a seal lip.

RELATED ART

DE 11 2006 002 478 T5 describes a roller bearing, comprising track rings, including an inner ring and outer ring, a plurality of roller bodies, which are disposed between the inner ring and the outer ring, and seal elements for sealing both ends of the bearing. An insulation layer is provided on an inner diameter surface and an end face of the inner ring or on an outer diameter surface and an end face of said outer ring, and the sealing member is formed of a resin material and has a channel shape in cross section, which projects from both end faces of the inner ring and the outer ring.

SUMMARY

It is an object of the invention to provide a roller bearing assembly having an improved service life.

In one aspect of the present teachings, a roller bearing assembly may include at least one roller bearing having an outer ring and an inner ring and roller bodies disposed therebetween, as well as a radial shaft seal having a support ring and a seal lip, wherein at least one end face of the outer ring has a receptacle for retaining the support ring, which extends in particular axially in an outwardly projecting manner beyond the end side of the outer ring and up to an outer circumferential surface of the inner ring, at which the seal lip connected with the support ring abuts in a contacting manner the outer circumferential surface of the inner ring axially internally of the end side of the outer ring.

Because at least one end side of the outer ring has a receptacle for retaining the support ring, no hollow installation space is required in the area of the inner track of the outer ring in order to be able to attach the radial shaft seal ring to the roller bearing in this area. Since no hollow installation space is required for the retention of the radial shaft seal ring in the area of the inner track of the outer ring, the entire breadth of the inner track of the outer ring can serve as a supporting surface for the roller bodies. An inventive roller bearing assembly can thus have the same load bearing capacity as an identically-dimensioned roller bearing without a seal. Because the load bearing capacity is not reduced relative to a design without a seal, the service life is maintained despite the attached seal, and/or the service life is increased relative to a known shortened design having an integrated seal.

Because the seal ring extends up to an outer circumferential surface of the inner ring, on which the seal lip connected with the support ring abuts in a contacting manner the outer circumferential surface of the inner ring axially internally of the end side of the outer ring, the inner ring can be formed just as small as a comparable roller bearing without a seal, i.e. the inner ring is not required to be formed wider than the outer ring, or the inner ring can, if desired, even have a smaller width than the outer ring.

If the support ring projects axially outwardly beyond the end side of the outer ring, a roller bearing cage can extend into the hollow space formed by the overhang of the support ring.

The support ring can be produced from metal, in particular deep-drawn steel strip, and can include a circular ring surface that directly abuts on the end side of the outer ring. A support ring made of metal or deep-drawn steel strip can impart an increased stiffness to the radial shaft seal ring. Because a circular ring surface of the support ring directly abuts on the end side of the outer ring, a position- and proximity-precise mounting of the radial shaft seal ring relative to the roller bearing, in particular relative to the inner ring on which the seal lip moves, can take place.

The receptacle can include an annular groove introduced into the end side of the outer ring, in which an outer edge segment of the support ring and/or an elastomeric-layer segment attached to the support ring engages. In addition or in the alternative to the annular groove, the receptacle can include a radial ledge introduced into the end side of the outer ring, on which an outer edge segment of the support ring and/or an elastomeric-layer segment attached to the support ring attaches. The radial shaft seal can be retained on the outer ring in an interference-fit manner by an annular groove introduced into the end side of the outer ring.

The outer ring can have a radial groove, in which a corresponding, in particular annular projection of the elastomeric-layer segment engages in an interference-fit manner. The groove can be, in particular, a wedge-shaped groove. The annular projection can be, in particular, a wedge-shaped projection. An interference-fit connection can be provided by the connection of the groove and annular projection, which connection can prevent an unintended detachment of the radial shaft seal from the outer ring.

The receptacle can include an annular groove having an axial recess introduced into the end side of the outer ring, in which axial recess an outer edge segment of the support ring, which extends in the axial direction, engages. A precise coaxial retention of the radial shaft seal ring relative to the inner ring of the roller bearing can be achieved by the intermeshed engagement of the axially-extending outer edge segment of the support ring and the axial recess.

The encircling outer edge segment of the support ring can be provided with an elastomeric-layer segment on its inwardly-pointing surface and/or on its axial end face and/or on its outwardly-pointing surface, the elastomeric-layer segment engaging in the annular groove together with the outer edge segment. As a result, the outer edge segment of the support ring can be elastically retained in the receptacle of the outer ring in an insulating manner.

In all embodiments, the support ring can include an annular inner edge segment encircling the outer circumferential surface of the inner ring at a distance, the seal lip being attached to the inner edge segment. The annular inner edge segment, which encircles the outer circumferential surface of the inner ring at a distance, ensures a stiff and position-correct as well as proximity-correct assembly of the seal lip. In particular, the seal lip can be thus retained in a precise coaxial position.

The seal lip can be disposed so as to abut on the outer circumferential surface of the inner ring axially outside of the inner edge segment of the support ring. In other words, the inner edge segment of the support ring extends up to nearly the roller bodies of the roller bearing, wherein the seal lip is disposed on a side of the inner edge segment that faces away from the roller bodies, i.e. the seal lip is located on an outer side of the support ring.

In all embodiments, the seal lip can be provided with a tension spring. The tension spring can be covered, in particular from above, i.e. radially outwardly, by a segment of the support ring.

In all embodiments, the support ring can include an axially-extending outer edge segment, a radially-extending inner edge segment and an annular trough-shaped middle segment. The annular trough-shaped middle segment can outwardly project, in particular axially, beyond the edge side of the outer ring.

A roller body cage can extend up into the annular trough-shaped middle segment of the support ring.

In all embodiments, the at least one roller bearing can be a tapered roller bearing, in particular a four-rowed tapered roller bearing. The inner edge segment of the support ring can extend up to under the outer edge side of the tapered rollers.

In all embodiments, the outer edge segment of the support ring can be retained on the outer ring in an interference-fit manner by a machine component abutting on the end side of the outer ring. The machine component can be a housing cover, in particular a housing cover of a rolling mill bearing, such as a work roll bearing. The support ring can be retained in an interference-fit manner, in particular, in an annular groove of the outer ring.

In summary, the invention provides in other words a new sealing design, in particular for tapered roller bearings, e.g., four-rowed tapered roller bearings. This new sealing design can be find application, in particular, in a rolling mill bearing, such as a work roll bearing application. The invention can be utilized, in particular, for bearings in roll stands, especially work roll bearings, because the current four-rowed tapered bearings are continuously subjected to cooling water as well as scaling of the steel processing process due to the ambient conditions. Four-rowed tapered roller bearings are available for open and sealed embodiments. The seals of the sealed variants should prevent the ingress of water and dirt into the bearing interior and thereby ensure a longer service life.

A disadvantage of the known sealed four-rowed tapered roller bearings is the lower load bearing capacity in comparison to the open embodiments. Because the seals take up a certain amount of space in the bearing, the roller bodies must be foimed shorter in each row, which leads to the decreased load bearing capacity. This reduction of the load bearing capacity should be avoided by the new seal design, in particular because the space taken up by the seal within bearing is minimized.

The inventive seal can be designed so that it can be attached to a slightly-modified open four-rowed tapered roller bearing, in particular also in the context of a retro-fit of existing bearings. Thus, a new embodiment variant of a sealed, four-rowed tapered roller bearing is no longer required.

The seal itself can be formed analogous to the design types of seals known in four-rowed tapered roller bearings. For example, deep-drawn steel strip as well as fluorinated rubber can be utilized as materials. Known seals are designed so that they should not exceed the outer dimensions of the bearing, i.e. the breadth corresponds to the entire breadth of the bearing and the seals require installation space only within the bearing.

The shape of the seal can be such that it can be attached to an open, four-rowed tapered roller bearing, wherein the outer dimensions of the bearing exceed the bearing breadth with the seal in the axial direction by a width dimension. Due to this design, it is possible to seal an originally open four-rowed tapered roller bearing and to maintain the full load bearing capacity of the open bearing, because the usage of shorter rollers is no longer necessary. Moreover, it is possible, in principle, to modify the inner structure of the bearing so that an intermediate seal can be inserted between the two inner rings. A groove and a ledge can be lathed into the end sides of the outer outer ring, which serve to receive the seal. An insertion plate of the seal can be produced from deep-drawn steel strip and can include a ledge that is smaller in inner diameter than the diameter in the groove lathed into the outer ring. Thus, a type of press-fit exists between the insertion plate and the groove, which can prevent the undesired detachment of the seal.

A fluorinated-rubber-coating can ensure the sealing effect on the outer diameter of the seal. The fluorinated-rubber-coating can be pressed into the groove. The outer diameter of the inner ring serves as the sealing surface for the fluorinated-rubber-seal lip attached to the insertion plate. A tension spring can supply a sufficiently high pressing force of the seal lip. In work roll bearings, a clearance is normally present, into which the axial projection of the seal can project without it leading to a hindrance during operation.

A further advantage of the inventive seal design is that the seals are supplementally retained in the installed state by a housing cover, which can axially clamp the outer rings, and thus an undesired detachment of the seals from the bearing is prevented during operation.

In an alternative embodiment with respect to the connection of the seal to the outer ring as well as relative to the seal lip designs, the outer ring can include a wedge-shaped groove. The seal can include an elastomeric coating, which is also shaped like a wedge in the area of the connection. When mounting the seal, the elastomeric wedge snaps into the wedge-shaped groove of the outer ring and thus retains the seal in the bearing. This snap solution can be simply provided to alone retain the seal in the bearing during the bearing assembly, wherein during operation the outer rings are biased by the housing cover and thus a detachment of the seal is prevented by the abutting housing cover.

Moreover, the seal lip can be formed with an increased seal lip length. A space available in the housing cover can be used to accommodate the axial projection of the seal.

Two exemplary embodiments of the invention are depicted in an exemplary manner in the appended schematic drawings.

DETAILED DESCRIPTION OF THE INVENTION

Figure 1:
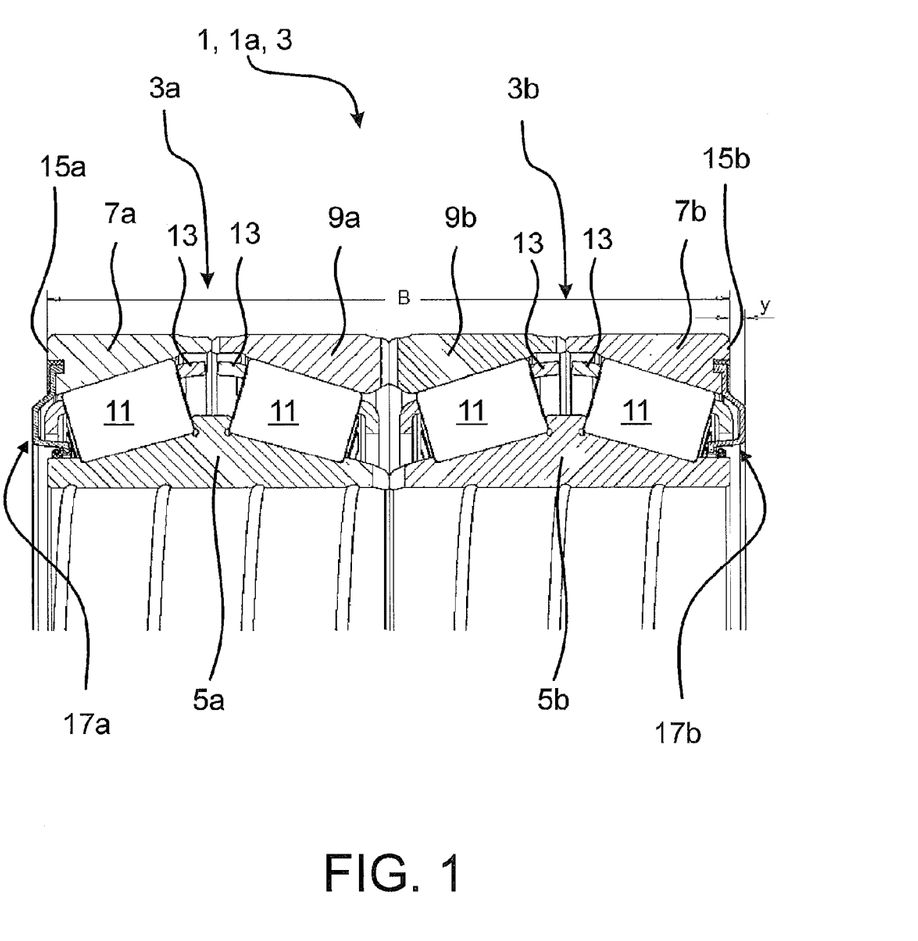
FIG. 1 shows a half cross-section of a first embodiment of an inventive roller bearing assembly.

In FIG. 1, a first embodiment of an inventive roller bearing assembly 1 is shown in half cross-section. The roller bearing assembly 1 is explained using the example of a roller bearing 1a being an embodiment of a sealed, four-rowed tapered roller bearing 3. The four-rowed tapered roller bearing 3 includes two two-rowed taper roller bearings 3a and 3b, which are disposed axially adjacent to each other. Each of the two-rowed tapered roller bearings 3a and 3b include a single inner ring 5a, 5b and two outer rings 7a, 9a, and 7b, 9b. Roller bodies 11 are disposed along each outer ring track of each outer ring 7a, 9a, and 7b, 9b and the inner ring track of the inner rings 5a, 5b. The roller bodies 11 of each individual tapered roller bearing 3 are guided by a roller bearing cage 13 in equally-maintained distances relative to each other. A radial shaft seal ring 17a, 17b is disposed on each of a first end side 15a of the one two-rowed tapered roller bearing 3a and on a second end side 15b of the other two-rowed tapered roller bearing 3b.

Figure 2:
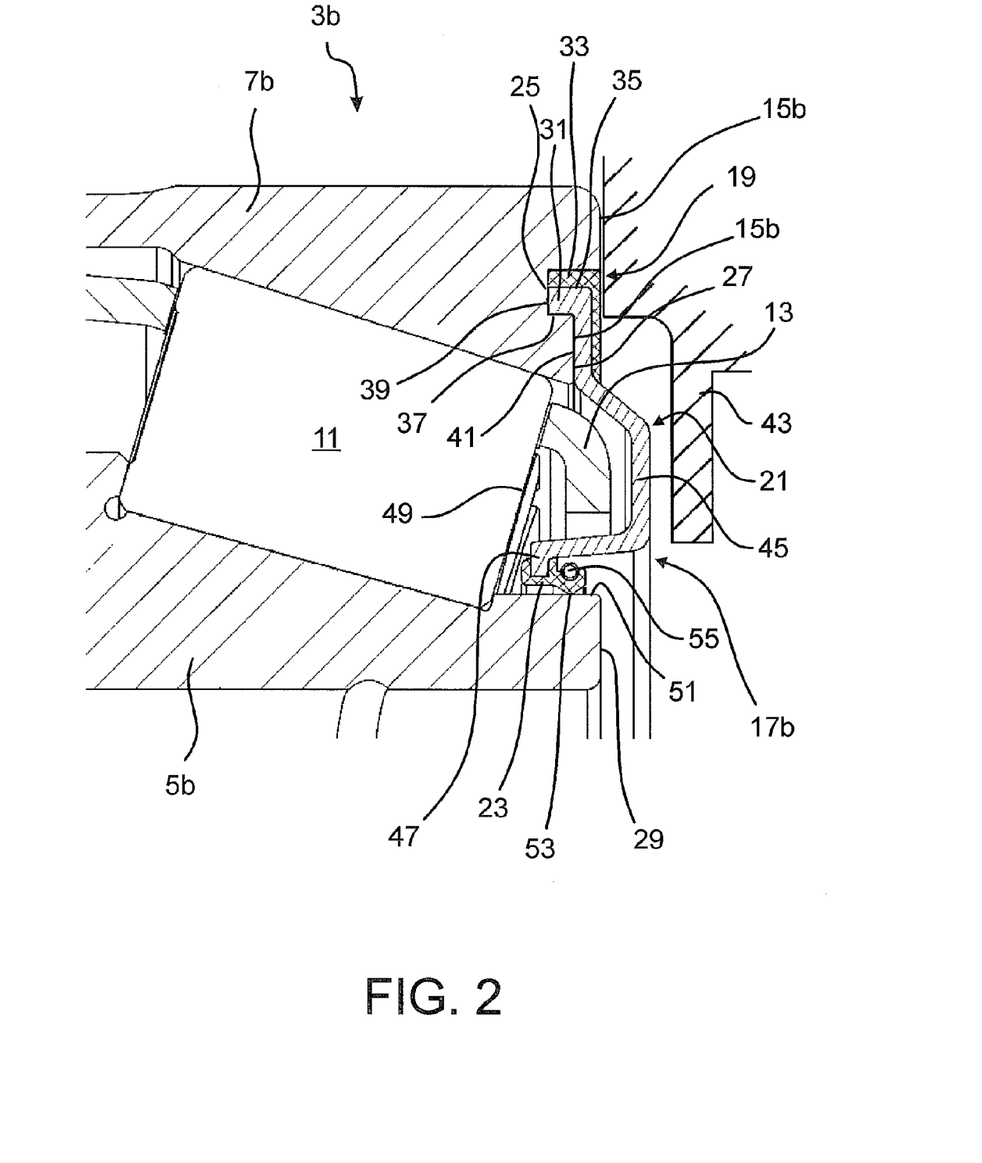
FIG. 2 shows an enlarged partial sectional view of the first embodiment according to FIG. 1.

In FIG. 2, the radial shaft seal ring 17b according to the first embodiment is shown in an enlarged illustration together with a segment of the tapered roller bearing 3b. The end side 15b of the outer ring 7b has a receptacle 19 for retaining the support ring 21 of the radial shaft seal ring 17b. The support ring 21 is a part of the radial shaft seal ring 17b and supports a seal lip 23.

The receptacle 19 is introduced into the end side 15b of the outer ring 7b. In the depicted exemplary embodiment, the receptacle 19 is formed by an annular groove 25 and a radial ledge 27. To form the annular groove 25 and the radial ledge 27, for example, a step can be introduced and/or lathed into the end side 15b, so that a radially-inward-lying surface half of the end side 15b is axially sunken. In the area of the thus-formed step, an annular groove 25, which is further axially sunken beyond the radially-inner-lying surface half of the end side 15b, can be additionally introduced and/or lathed, as is realized in the exemplary embodiment. In this regard, the annular groove 25 can thus be located in the area of the step. In other words, an L-shaped recess is formed on the end side 15b of the outer ring 7b as a result. Relative to a standardized design size of the roller bearing 1a and/or the tapered roller bearing 3b, the radially-outer-lying surface half of the end side 15b does not axial protrude from the end side of the roller bearing 1a and/or the tapered roller bearing 3b, but rather the radially-inner-lying surface half of the end side 15b is axially sunken relative to the standardized design size, i.e. the radially-inner-lying surface half of the end side 15b is axially deeper in the roller bearing 1a and/or in the tapered roller bearing 3b than the end side 29 of the inner ring 5b.

In the depicted exemplary embodiment, an outer edge segment 31 of the support ring 21 and an elastomer layer segment 33, which is attached, preferably vulcanized, onto the support ring 21, engage in the receptacle 19 and/or in the annular groove 25 and/or on the radial ledge 27. The encircling outer edge segment 31 of the support ring 21 is, as illustrated, provided with an elastomeric-layer segment on its outward-pointing surface 35. In the alternative or in addition, the encircling outer edge segment 31 can be provided with an elastomeric-layer segment on its inward-pointing surface 37 and/or on its axial end face 39. The elastomeric-layer segment 33, together with the outer edge segment 31, engages in the annular groove 25.

The support ring 21 is preferably produced from metal, in particular from deep-drawn steel strip. The support ring 21 has a circular ring surface 41, which directly abuts on the end side 15b, i.e. according to the embodiment of FIG. 2 on the radially-inner-lying surface half of the end side 15b of the outer ring 7b. The outer edge segment 31 of the support ring 21 is retained in an interference-fit manner on the outer ring 7b, i.e. in the annular groove 25, by a machine component, in particular a housing cover 43, abutting on the end side 15b of the outer ring 7b.

The circular ring surface 41 connects to the axially-extending outer edge segment 31 of the support ring 21, which surface 41 transitions into an annular trough-shaped middle segment 45; an annular, encircling inner edge segment 47, in turn, connects to the middle segment 45. In the exemplary embodiment, the annular trough-shaped middle segment 45 axially outwardly projects beyond the end side 15b of the outer ring 7b. The roller bearing cage 13 extends up into the annular trough-shaped middle segment 45 of the support ring 21. At the same time, the inner edge segment 47 of the support ring 21 can extend up to under the outer end sides 49 of the tapered rollers 11.

The inner edge segment 47 ends with a spacing to an outer circumferential surface 51 of the inner ring 5b. The seal lip 23 is attached to the end of the annular, encircling inner edge segment 47 of the support ring 21. The seal lip 23 has a sealing edge 53, which sealingly abuts on the outer circumferential surface 51 of the inner ring 5b. The seal lip 23 is provided with a tension spring 55.

Figure 3:
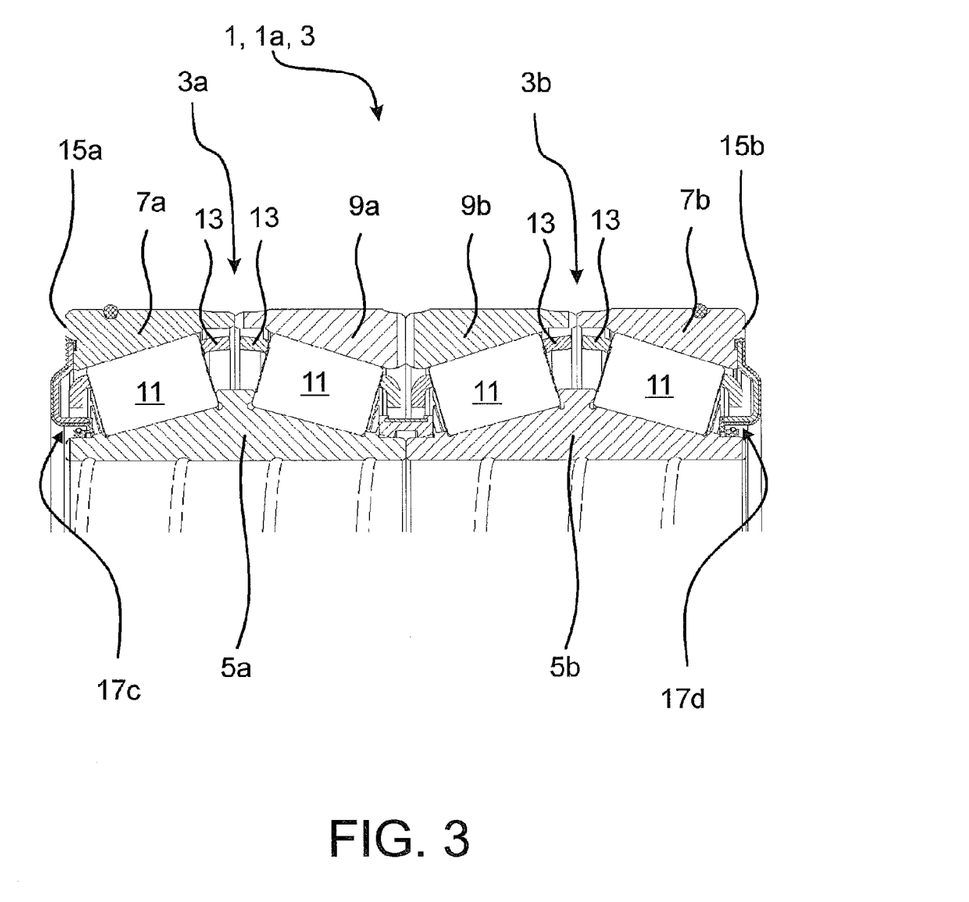
FIG. 3 shows a half cross-section of a second embodiment of an inventive roller bearing assembly.

In FIG. 3, the second embodiment of an inventive roller bearing assembly 1 is depicted in half cross-section. The roller bearing assembly 1 is explained, as in FIG. 1, using the example of a roller bearing 1a being an embodiment of a sealed, four-rowed tapered roller bearing 3. The four-rowed tapered roller bearing 3 includes two two-rowed taper roller bearings 3a and 3b, which are disposed axially adjacent to each other. Each of the two-rowed tapered roller bearings 3a and 3b include a single inner ring 5a, 5b and two outer rings 7a, 9a, and 7b, 9b. Roller bodies 11 are disposed along each outer ring track of each outer ring 7a, 9a, and 7b, 9b and the inner ring track of the inner rings 5a, 5b. The roller bodies 11 of each individual tapered roller bearing 3 are guided by the roller bearing cage 13 in equally-maintained distances relative to each other. The radial shaft seal ring 17c, 17d according to the second embodiment is disposed on the first end side 15a of the one two-rowed tapered roller bearing 3a and on the second end side 15b of the other two-rowed tapered roller bearing 3b.

Figure 4:
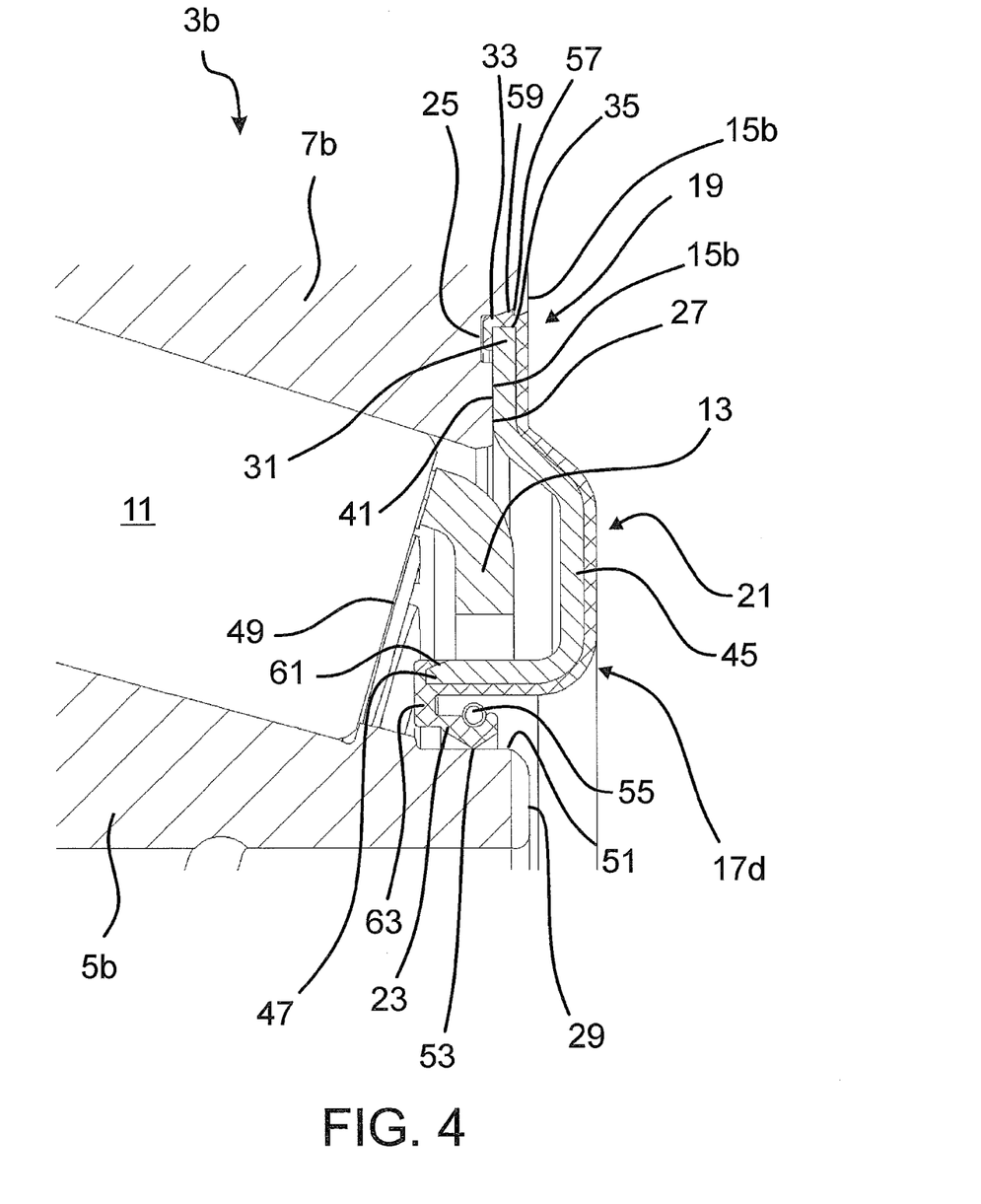
FIG. 4 shows an enlarged partial sectional view of the second embodiment according to FIG. 3.

In FIG. 4, the radial shaft seal ring 17d according to the second embodiment is shown in an enlarged illustration together with a segment of the tapered roller bearing 3b. Relative to the first embodiment according to FIG. 2, the second embodiment according to FIG. 4 includes the modifications described in the following.

In the second embodiment, the outer edge segment 31 of the support ring 21 does not extend in an axial direction, but rather in a radial direction. Therefore, the preferably-vulcanized elastomeric-layer segment 33 surrounds the outer edge segment 31 on three sides. The annular groove 25 has an additional wedge-shaped groove 57. A wedge-shaped annular projection 59 of the elastomeric-layer segment 33 engages in the additional wedge-shaped groove 57. The support ring 21 includes the elastomeric-layer segment 33 not only in the area of the outer edge segment 31 and in the area of the inner edge segment 47, but also the elastomeric-layer segment 33 extends over the entire outer side of the support ring 21. In the second embodiment, the inner edge segment 47 is not bent into a radial direction, but rather merely extends axially. The inner edge segment 47 can be provided with a chamfer 61. The seal lip 23 having a radially-extending intermediate segment 63 is integrally formed on the inner edge segment 47 and/or on the chamfer 61. In the second embodiment, the seal lip 23 is connected with the elastomer-layer segment 33 and/or is integrally formed on this elastomeric-layer segment 33.

REFERENCE NUMBER LIST

1 Roller bearing assembly
3 Four-rowed tapered roller being
3a, 3b Two-rowed tapered roller bearing
5a, 5b Inner ring
7a, 7b Outer ring 9a, 9b Outer ring
11 Roller bodies
13 Roller bearing cage
15a First end side
15b Second end side
17a, 17b Radial shaft seal ring
19 Receptacle
21 Support ring
23 Seal lip
25 Annular groove
27 Radial ledge
29 End side
31 Outer edge segment
33 Elastomeric-layer segment
35 Outwardly-pointing surface
37 Inwardly-pointing surface
39 Axial end face
41 Circular ring surface
43 Housing cover
45 Middle segment
47 Inner edge segment
49 Outer end side
51 Outer circumferential surface
53 Sealing edge
55 Tension spring
57 Wedge-shaped groove
59 Wedge-shaped annular projection
61 Chamfer
63 Intermediate segment

The invention claimed is:

1. A roller bearing assembly including:
    at least one roller bearing having a plurality of roller bodies disposed between at least one outer ring and at least one inner ring, and
    a radial shaft seal ring having a support ring and a seal lip, wherein at least one axial end side of the outer ring includes a receptacle, in which the support ring is retained,
    the support ring radially extends up to adjacent an outer circumferential surface of the inner ring,
    the seal lip sealingly abuts on the outer circumferential surface of the inner ring at a position that is axially internal of the at least one axial end side of the outer ring,
    the receptacle includes an annular groove defined in the at least one axial end side of the outer ring,
    at least one of an outer edge segment of the support ring and an elastomeric-layer segment attached to the support ring is engaged in the annular groove,
    wherein:
    the support ring is a metal part that includes a circular ring surface and an outer edge segment extending axially from a radially-outer end of the circular ring surface,
    a portion of the support ring axially outwardly projects beyond the at least one axial end side of the outer ring,
    the receptacle further includes a second annular groove defined in the at least one axial end side of the outer ring, the annular groove being deeper than the second annular groove,
    the outer edge segment of the support ring is disposed in the annular groove, and
    the circular ring surface directly abuts on the second annular groove.

2. The roller bearing assembly according to claim 1, wherein the support ring is a metal part and includes a circular ring surface that directly abuts on the at least one axial end side of the outer ring.

3. The roller bearing assembly according to claim 1, wherein:
    a portion of the support ring axially outwardly projects beyond the at least one axial end side of the outer ring.

4. The roller bearing assembly according to claim 1, wherein:
    the outer ring includes a radial groove and
    the elastomeric-layer segment includes a corresponding radial annular projection that is engaged in the annular groove in an interference-fit manner.

5. The roller bearing assembly according to claim 1, wherein:
    the annular groove has an axially-extending recess defined in the at least one axial end side of the outer ring and
    an axially-extending outer edge segment of the support ring is engaged in the axially-extending recess.

6. The roller bearing assembly according to claim 5, wherein:
    the elastomeric-layer segment is disposed on at least one of an axially-inwardly-pointing surface, an axial end face and an axially-outwardly-pointing surface of the outer edge segment of the support ring, wherein the elastomeric-layer segment and the outer edge segment are engaged in the annular groove.

7. The roller bearing assembly according to claim 1, wherein the support ring includes an annular inner edge segment encircling the outer circumferential surface of the inner ring with a clearance therebetween, the seal lip being attached to the inner edge segment.

8. The roller bearing assembly according to claim 7, wherein the seal lip abuts on the outer circumferential surface of the inner ring axially outside of the inner edge segment of the support ring.

9. The roller bearing assembly according to claim 8, further comprising a tension spring radially inwardly biasing the seal lip.

10. The roller bearing assembly according to claim 1, wherein the support ring includes an axially-extending outer edge segment, a radially-extending inner edge segment and an annular trough-shaped middle segment that axially outwardly projects beyond the at least one end side of the outer ring.

11. The roller bearing assembly according to claim 10, further comprising a roller body cage that extends up into the annular trough-shaped middle segment of the support ring.

12. The roller bearing assembly according to claim 1, wherein the at least one roller bearing comprises four rows of tapered roller bodies.

13. The roller bearing assembly according to claim 12, wherein an axially-inner edge segment of the support ring extends up to under an axially-outer edge side of the tapered rollers.

14. The roller bearing assembly according to claim 1, wherein an axially-outer edge segment of the support ring is retained on the outer ring in an interference-fit manner by a machine component abutting on the at least one axial end side of the outer ring.

15. The roller bearing assembly according to claim 14, wherein the machine component comprises a housing cover for the at least one roller bearing.

16. The roller bearing assembly according to claim 1, wherein:
    the elastomeric layer is attached to the outer edge segment of the support ring and is engaged in the annular groove in an interference-fit manner.

17. The roller bearing assembly according to claim 16, wherein:
    the support ring further includes an annular inner edge segment encircling the outer circumferential surface of the inner ring with a clearance therebetween, the seal lip being attached to the inner edge segment and abutting on the outer circumferential surface of the inner ring axially outside of the inner edge segment of the support ring; and a tension spring radially inwardly biases the seal lip.

18. The roller bearing assembly according to claim 17, wherein:

the support ring further includes an annular trough-shaped middle segment radially extending from the circular ring surface, the annular trough-shaped middle segment axially outwardly projecting beyond the at least one end side of the outer ring, and a roller body cage extends into a hollow space defined within the annular trough-shaped middle segment of the support ring.

19. The roller bearing assembly according to claim 18, wherein:

the at least one roller bearing comprises four rows of tapered roller bodies, the annular inner edge segment of the support ring axially extends underneath an axially- outer edge side of the tapered rollers and the outer edge segment of the support ring is retained on the outer ring in an interference-fit manner by a housing cover abutting on the at least one axial end side of the outer ring.

* * * * *